Figure 3:
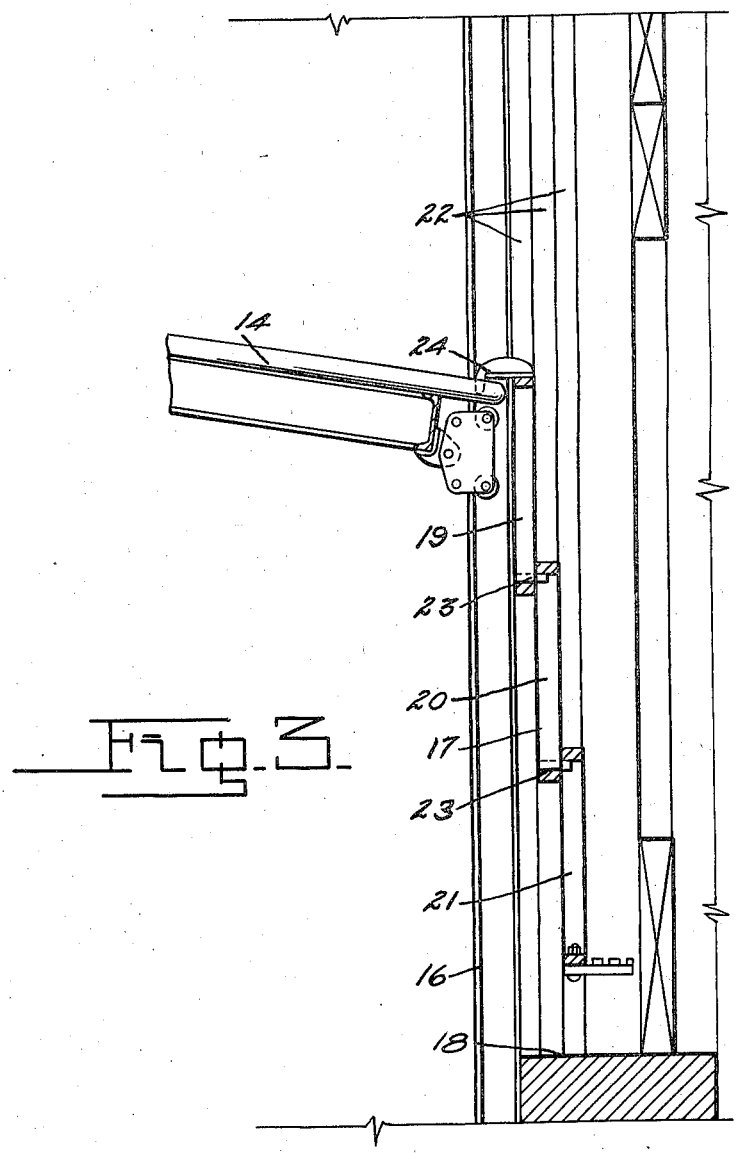

Dec. 21, 1937.  L. E. KNERR  2,102,628
TELESCOPIC BARRIER IN CONNECTION WITH EXIT PORTAL IN FISH LIFTS
Filed May 25, 1937  2 Sheets-Sheet 1
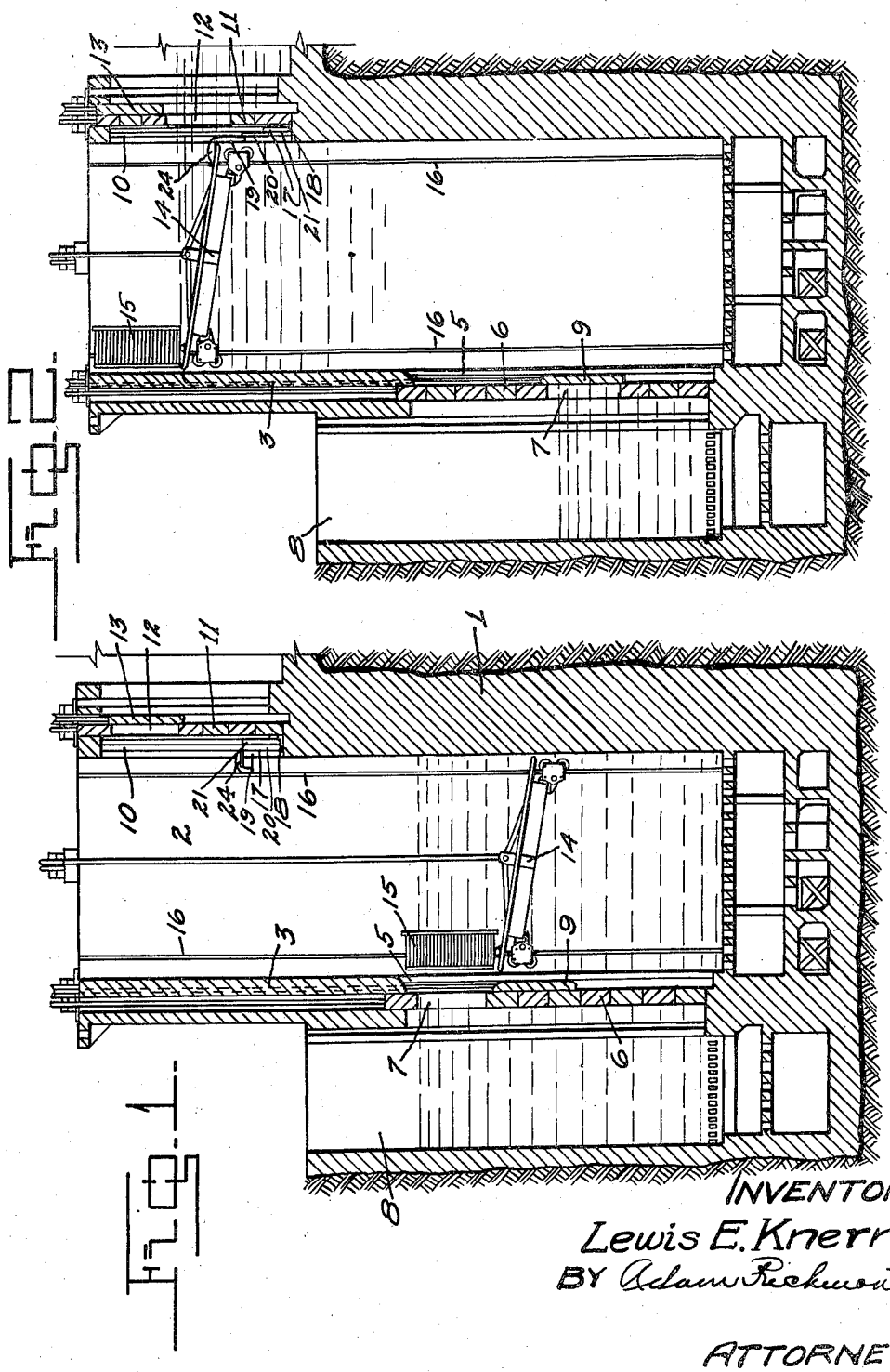
INVENTOR
Lewis E. Knerr
BY Adam Richmond
ATTORNEY Dec. 21, 1937.　　　　　L. E. KNERR　　　　　2,102,628
TELESCOPIC BARRIER IN CONNECTION WITH EXIT PORTAL IN FISH LIFTS
Filed May 25, 1937　　　2 Sheets-Sheet 2

INVENTOR
Lewis E. Knerr
BY Adam Richmond
ATTORNEY

Patented Dec. 21, 1937

2,102,628

UNITED STATES PATENT OFFICE 2,102,628

TELESCOPIC BARRIER IN CONNECTION WITH EXIT PORTAL IN FISH LIFTS

Lewis E. Knerr, Portland, Oreg., assignor to the Government of the United States of America, represented by the Secretary of War Application May 25, 1937, Serial No. 144,616

5 Claims. (Cl. 61—21)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to collapsible barriers for the exit portals of fish locks, also disclosed in application No. 146,016 filed June 2, 1937 by Harlan B. Holmes, Henry Blood and Milo C. Bell, and entitled Method and apparatus for transferring migratory fish over a dam structure. More specifically this invention is directed to a series of interconnected barrier units adapted to be automatically actuated to operative position by a fish lift, as the latter approaches its fish discharging position.

One object of this invention is to provide a collapsible segmental barrier adapted to be mounted on the sill of the exit portal of a fish lock, the barrier when extended to operative position by the action of the fish lift, functioning to prevent passage of the fish beneath the fish lift.

Another object of this invention is to provide a collapsible barrier in connection with the exit portal of a fish lock, the barrier being composed of a series of interconnected and normally collapsed barrier units located on the sill of the exit portal of the fish lock and being automatically extensible to a position partially closing the exit portal, the extent of the closure being dependent upon the fish discharging position of the lift.

Another object of this invention is to provide a collapsible barrier construction adapted to be located on the sill of the exit portal of a fish lock and to be extended by the fish lift as the latter passes the sill to its fish discharging position, the barrier serving to close the space between the bottom of the fish lift and the sill of the exit portal.

With these and other objects in view this invention consists in certain novel details of construction, combination and arrangement of parts to be more particularly hereinafter described and claimed.

Referring to the accompanying drawings in which corresponding parts are indicated by similar reference characters:

Fig. 1 is a transverse vertical section of a dam structure illustrating a fish lock, the fish lift operating in the lock, an entrance bay adjacent the lock, and showing the collapsible barrier structure situated in the exit portal of the lock;

Fig. 2 is a similar view illustrating the fish lift in fish discharging position and showing the collapsible barrier after it has been extended by the fish lift, and Fig. 3 is an enlarged fragmentary elevation partly in section, illustrating the telescopic barrier in extended position and showing the operative association between the end of the fish lift and the upper end of one of the barrier units.

In the illustrated embodiment characterizing this invention; (1) indicates a dam construction, (2) a fish lock having a downstream wall (3) formed with an entrance portal (5), adjacent to which is disposed a segmental gate structure (6), the units of which are relatively adjustable to provide an opening (7) which establishes communication between the interior of the lock and the entrance bay (8). Opening (7) is controlled by a slidable gate (9), as clearly shown in Figs. 1 and 2 of the drawings. The upstream wall is likewise formed with an exit portal (10), immediately adjacent to which is arranged a segmental gate structure (11), the segments being adjustable to provide an opening (12), which establishes communication between the interior of the lock and the forebay. Opening (12) is adapted to be closed by a sliding gate (13). A fish lift (14) carrying a fish trap (15) operates in the guides (16) which are suitably located adjacent the inner surfaces of the downstream and upstream walls respectively of the lock, as shown in Fig. 1.

As the lift ascends to the exit portal of the lock its fish discharging position will vary in accordance with forebay elevation and for this reason a variable opening will be formed between the bottom of the lift and the sill of the exit portal of the lock which would permit the fish leaving the lift to pass beneath the latter. For this reason a collapsible barrier (17) is disposed upon the sill (18) of the exit portal (10). Barrier (17) consists of a series of segmental units (19), (20) and (21), which are slidably mounted in suitably arranged grooves (22) formed in the side walls of the exit portal (10). The units (19), (20) and (21) are interconnected as at (23) and normally nested as shown in Fig. 1. The upper end of the innermost barrier unit is formed with a contact member (24) which is adapted to be engaged by one end of the fish lift (14) as the lift passes the sill (18) of the exit portal (10), whereupon the units will be gradually extended until they attain the position shown in Fig. 3 of the drawings. As the lift descends to fishing position the units will return to their normal nested position.

In conclusion it will be apparent that as the fish lift (14), approaches the fish exit (12), the barrier units will be extended to a position which will seal the space between the bottom of the fish lift and the sill (18) of the exit portal so that the fish as they travel through the exit portal will be unable to pass beneath the fish lift, as will be understood without further discussion.

Having described my invention, what I claim as new and wish to secure by Letters Patent is:

1. A dam structure of the character described comprising a fish lock having an exit portal, the latter including a sill, a fish lift operable in the lock to a fish discharging position with respect to the exit portal and means in connection with the exit portal and coacting with the fish lift to close the space between the bottom of the fish lift and the sill of the exit portal when the lift is in its fish discharging position.

2. A dam structure of the character described comprising a fish lock having an exit portal, the latter including a sill, a fish lift operable in the lock to a fish discharging position with respect to the exit portal and means in connection with the exit portal and coacting with the fish lift to close the space between the bottom of the fish lift and the sill of the exit portal when the lift is in its fish discharging position, said means including a series of interconnected units.

3. A dam structure of the character described comprising a fish lock having an exit portal, the latter including a sill, a fish lift operable in the lock to a fish discharging position with respect to the exit portal and means in connection with the exit portal and coacting with the fish lift to close the space between the bottom of the fish lift and the sill of the exit portal when the lift is in its fish discharging position, said means including a series of normally collapsed interconnected units.

4. A dam structure of the character described comprising a fish lock having an exit portal, the latter including a sill, a fish lift operable in the lock to a fish discharging position with respect to the exit portal, a collapsible barrier member disposed upon the sill of the exit portal and including a series of normally collapsed extensible sections and means in connection with one of the sections and coacting with the fish lift to effect extension of the barrier as the fish lift approaches its fish discharging position.

5. A dam structure of the character described comprising a fish lock having an exit portal, the latter including a sill, a fish lift operable in the lock to a fish discharging position with respect to the exit portal, a collapsible barrier disposed on the sill of the exit portal and including a series of interconnected units normally disposed in a collapsed position, and an extension on one of the units adapted to engage the fish lift as the latter passes the sill of the exit portal, said engagement effecting extension of the barrier to close the space between the bottom of the lift and the sill of the exit portal.

LEWIS E. KNERR.